(12) United States Patent
Becquet et al.

(10) Patent No.: US 12,522,188 B2
(45) Date of Patent: Jan. 13, 2026

(54) ACTUATOR PROVIDED WITH TWO PRESSURE SENSORS AND A VIRTUAL PRESSURE SENSING DEVICE; A BRAKING SYSTEM AND AN AIRCRAFT PROVIDED WITH SUCH AN ACTUATOR, AND THE METHOD APPLIED

(71) Applicant: AIRBUS HELICOPTERS, Marignane (FR)

(72) Inventors: Roland Becquet, Meyreuil (FR); Grégory Basset, Martigues (FR); Thomas Grondin, Eyguieres (FR); Antonin Rocher, Ensues-la-Redonne (FR)

(73) Assignee: AIRBUS HELICOPTERS, Marignane (FR)

( * ) Notice: Subject to any disclaimer, the term of this patent is extended or adjusted under 35 U.S.C. 154(b) by 63 days.

(21) Appl. No.: 18/746,828

(22) Filed: Jun. 18, 2024

(65) Prior Publication Data

US 2025/0162550 A1    May 22, 2025

(30) Foreign Application Priority Data

Nov. 16, 2023 (FR) ...................... 2312560

(51) Int. Cl.
*B60T 8/172* (2006.01)
*B60Q 9/00* (2006.01)
(Continued)

(52) U.S. Cl.
CPC ............... *B60T 8/172* (2013.01); *B60Q 9/00* (2013.01); *B60T 8/171* (2013.01); *B60T 13/686* (2013.01);
(Continued)

(58) Field of Classification Search
CPC ........ B60T 8/172; B60T 8/171; B60T 13/686; B60T 17/22; B60T 2270/402;
(Continued)

(56) References Cited

U.S. PATENT DOCUMENTS

2020/0331448 A1  10/2020  Perigord et al.

FOREIGN PATENT DOCUMENTS

| CN | 103786704 B | 3/2016 |
| CN | 115978028 A | 4/2023 |

(Continued)

OTHER PUBLICATIONS

French Search Report for French Application No. FR2312560, Completed by the French Patent Office, Dated May 7, 2024, 22 pages.

*Primary Examiner* — Lindsay M Low
*Assistant Examiner* — Charles J Brauch
(74) *Attorney, Agent, or Firm* — BROOKS KUSHMAN P.C.

(57) ABSTRACT

An actuator provided with a pump connected to a first hydraulic connection connected to a reservoir and to a second hydraulic connection. A command controller communicates with a first pressure sensor arranged on the second hydraulic connection and measuring a first supply pressure. A monitoring controller communicates with the command controller and a second pressure sensor arranged on the second hydraulic connection and measuring a second supply pressure. A virtual pressure sensing device is provided with a verification instrument transmitting at least one verification signal carrying an operating parameter of the pump to the command controller and to the monitoring controller in order to identify a failure of the actuator and consequently apply a degraded operating mode.

14 Claims, 2 Drawing Sheets

(51) Int. Cl.
  *B60T 8/171* (2006.01)
  *B60T 13/68* (2006.01)
  *B60T 17/22* (2006.01)
  *B64C 25/44* (2006.01)

(52) U.S. Cl.
  CPC .............. *B60T 17/22* (2013.01); *B64C 25/44* (2013.01); *B60T 2270/402* (2013.01); *B60T 2270/406* (2013.01); *B60T 2270/413* (2013.01)

(58) Field of Classification Search
  CPC ......... B60T 2270/406; B60T 2270/413; B60T 2270/86; B60T 8/885; B60T 2270/403; B60T 8/325; B60T 8/1703; B60Q 9/00; B64C 25/44
  See application file for complete search history.

(56) References Cited

FOREIGN PATENT DOCUMENTS

| | | | |
|---|---|---|---|
| EP | 3772442 | B1 | 11/2022 |
| EP | 4086169 | A1 | 11/2022 |
| FR | 3076267 | B1 | 1/2020 |
| IN | 202241014142 | A * | 9/2023 |

* cited by examiner

ACTUATOR PROVIDED WITH TWO PRESSURE SENSORS AND A VIRTUAL PRESSURE SENSING DEVICE; A BRAKING SYSTEM AND AN AIRCRAFT PROVIDED WITH SUCH AN ACTUATOR, AND THE METHOD APPLIED

CROSS REFERENCE TO RELATED APPLICATION

This application claims the benefit of FR 23 12560 filed on Nov. 16, 2023, the disclosure of which is incorporated in its entirety by reference herein.

TECHNICAL FIELD

The present disclosure relates to an actuator provided with two pressure sensors and a virtual pressure sensing device, a method for controlling such an actuator, and a braking system and an aircraft provided with such an actuator.

BACKGROUND

An aircraft may comprise a plurality of landing gears each comprising at least one wheel. The expression "wheeled landing gears" is used hereinafter to denote such a landing gear, irrespective of the number of wheels."

Therefore, a rotorcraft may comprise two main landing gears and one auxiliary landing gear each comprising one or more wheels.

Such an aircraft also comprises a braking system, in particular for immobilizing the aircraft in a parking area.

A known braking system comprises a brake fluid reservoir. The reservoir is hydraulically connected to a hydraulic inlet of a brake relay by a pump and a check valve. An accumulator is hydraulically connected in parallel to the hydraulic inlet of the brake relay. Finally, the brake relay is hydraulically connected to two brakes of two respective main landing gears. Each brake may comprise at least one hydraulic jack capable of moving a brake stator against a brake rotor secured to a wheel of the landing gear in question.

The brake relay comprises one hydraulic selector valve for each brake. Each hydraulic selector valve comprises a piston delimiting a chamber in hydraulic communication with a brake control device. Operating the brake control device causes a fluid to flow into the chamber, pushing the piston. When the piston moves, a valve opens and the associated brake is pressurized.

Moreover, a parking brake control handle is linked to two cams cooperating with the two pistons. Acting on the parking brake handle makes the two cams rotate, causing the two pistons to move and the two valves to open, pressurizing the two brakes.

When the aircraft is operating, the hydraulic energy required for braking is provided by the pump. When not operating, this hydraulic energy is provided by the accumulator. Though effective, this braking system is based on using the same source of hydraulic power for the two brakes. A hydraulic leak can therefore make the two brakes inoperative at the same time.

Document EP3772442 B1 describes a braking system comprising a hydraulic or pneumatic supply line supplying a control valve in hydraulic or pneumatic communication with a brake. Moreover, the control valve communicates with a parking brake valve via a check valve, the parking brake valve being connected to a hydraulic or pneumatic return line. A controller configured to control the valves is connected to a parking brake control, to a brake control and to a pressure sensor.

When the brake control is positioned in an engaged position, the controller closes the parking brake valve and compares the measured pressure to a threshold. If the pressure is lower than the threshold, the controller deduces that a malfunction has occurred. The controller can command the parking brake control to move to a non-engaged position in order to inform an operator, and can open the parking brake valve.

Document FR3076267 B1 describes a method for diagnosing a state of wear of an actuator. This method comprises measuring a signal originating from the actuator motor, running a windowing algorithm in order to obtain, from the signal, a data set comprising first and second maximums, establishing a score assigned to the data set, and evaluating the wear as a function of the score.

Moreover, a known system comprises an electrohydraulic actuator provided with a pump hydraulically connected to a reservoir and to a hydraulic connection. The pump is controlled by a controller in communication with a pressure sensor measuring the pressure in the hydraulic connection. This system is advantageous, but the system is rendered inoperative if the pressure sensor fails.

In order to overcome this, a known monitoring architecture comprises a command controller connected to a command sensor and a monitoring controller connected to a monitoring sensor measuring substantially the same parameter as the command sensor. The monitoring controller verifies that a command sent to the command controller is nominally applied. The monitoring part is therefore separate from the command part. Such an architecture is sometimes referred to as a COM/MON architecture, the term COM referring to the command controller and the term MON referring to the monitoring controller. Such a monitoring architecture is advantageous, but requires sensors that are prone to failure to be duplicated.

Document EP 4 086 169 A1 describes a braking system for an airplane comprising a braking jack; a primary hydraulic fluid supply circuit configured to supply pressurized hydraulic fluid to the braking jack; and a secondary hydraulic fluid supply circuit.

Document CN 103 786 704 B describes a braking system provided with a main braking system comprising a hydraulic source hydraulically connected to a brake actuator. Moreover, the braking system comprises a backup braking system including a pump that is set in motion by a wheel via a transmission mechanism.

Document CN 115 978 028 A describes a braking system for an aircraft. This system comprises a reversible pump for controlling a jack.

SUMMARY

An object of the present disclosure is thus to propose an innovative actuator intended to have acceptable failure tolerance, in particular for use in a braking system of a vehicle.

The disclosure therefore relates to an actuator provided with a pump connected to a first hydraulic connection and to a second hydraulic connection, the first hydraulic connection being connected to a reservoir containing a fluid, said actuator having a command controller communicating with a first pressure sensor, the first pressure sensor being arranged on the second hydraulic connection and measuring a first supply pressure, said actuator comprising a monitoring controller communicating with the command controller and a second pressure sensor, the second pressure sensor being arranged on the second hydraulic connection and measuring a second supply pressure, in a nominal operating mode the monitoring controller being configured to monitor the actuator as a function of the second supply pressure and the command controller being configured to slave a pressure of the fluid delivered by said pump in the second hydraulic connection to a pressure setpoint as a function of the first supply pressure.

This actuator comprises a virtual pressure sensing device provided with a pressure model depending on a value of at least one operating parameter of the pump evaluated with a verification instrument that transmits at least one verification signal carrying said value to the command controller and to the monitoring controller in order to identify a failure of the actuator and consequently apply a degraded operating mode.

The expression "verification instrument" may denote a module capable of directly measuring the value of the operating parameter in question, or indeed a system that can comprise one or more sensors and/or signal processing means for providing an estimate of this value of the operating parameter.

The actuator is therefore an electrohydraulic actuator provided with multiple pressure measuring in means and, particular, an actuator conveying a hydraulic fluid into a brake, if necessary. This actuator may in particular be an actuator for a braking system. The braking system may be used in various mechanical systems, and, for example, on a vehicle, this vehicle being able to be an aircraft.

The monitoring controller and the command controller are separate and functionally segregated, although they may, for example, be different parts of the same unit, such as an electronic board, for example. Similarly, the first pressure sensor and the second pressure sensor are separate.

The first pressure sensor and the second pressure sensor may be positioned to measure a pressure in the same segment of the second hydraulic connection, i.e., substantially the same pressure.

The first pressure sensor is used in the nominal operating mode to control the pump, or a valve described below. The second pressure sensor is used to monitor the operation of the actuator.

When the brake is not applied, the second pressure sensor is, for example, used by the monitoring controller, that verifies that the pressure inside the second hydraulic connection is zero. If this is not the case, the monitoring controller can apply a degraded operating mode by signaling a fault to an alerter and/or by inhibiting the pump, for example by transmitting a signal to an electrical relay or an equivalent to stop supplying electrical power to the pump and/or the command controller.

When the parking brake is applied, the second pressure sensor is, for example, used by the monitoring controller to verify that the pressure inside the second hydraulic connection is equal to a target pressure at the end of a specified time period, for example a pressure in the region of 70 bars, plus or minus 5 bars, after 2 seconds, and to apply a degraded operating mode if this is not the case.

The actuator also comprises a virtual pressure sensing device dissimilar to and separate from the first and second pressure sensors, for determining whether one of the first and second pressure sensors or the pump is malfunctioning. This virtual pressure sensing device does not measure pressure per se, but transmits at least one verification signal that varies as a function of an operating parameter of the pump that is a reflection of the pressure downstream from the pump.

Indeed, the pressure inside the second hydraulic connection depends on the volume of fluid delivered by the pump, and can therefore also be evaluated not with a pressure sensor but by means of an operating parameter that varies together with this volume.

The monitoring controller and the command controller are configured to deduce a pressure value from the verification signal or signals transmitted, or directly the indirectly, by verification instrument, in order to determine whether the first pressure sensor or the second pressure sensor or the pump is malfunctioning, by comparison with the first supply pressure and the second supply pressure. If a failure is detected, a degraded operating mode is applied.

As a result, the failure of a pressure sensor does not necessarily result in the total loss of the actuator, due to the presence of the virtual pressure sensing device. The actuator has, in particular, increased tolerance to the failure of a pressure sensor.

The actuator may also comprise one or more of the following features, taken individually or in combination.

According to one possibility, the virtual pressure sensing device can measure one or more of the following operating parameters: the position of a movable element of the pump that causes liquid to flow through the pump, and an electrical characteristic of an electric motor of the pump.

Therefore, the pump may comprise an electric motor having a movable component that sets a pumping member in motion in relation to a housing, the verification instrument measuring at least one of the following operating parameters: the movement of said pumping member or of said component, electrical characteristic of an electric current supplying electrical power to the motor or flowing in this motor.

For example, the verification instrument comprises a position sensor evaluating the number of rotations made by a rotor of the electric motor during an operating phase of the pump, for example by detecting the successive times a mark of the rotor passes in front of a Hall effect sensor or the like, or indeed a temperature sensing device.

The virtual pressure sensing device may then comprise a pressure model conversion law providing a pressure as a function of the movement of said pumping member, or of the temperature. The term "law" refers hereinafter, for example, to a table of values or the like, one or more mathematical equations, an artificial intelligence and, by way of illustration, a neural network, etc.

Alternatively, the operating parameter may be an electrical characteristic, such as the electrical power consumed by the motor during an operating phase of the pump, for example. The electrical power consumed is a reflection of the pressure and the flow rate of the fluid at the pump outlet. Knowing this electrical power, possibly combined with a speed of rotation of said component of the pump motor, that is measured with a speed sensing device or is known, makes it possible to create an advantageous pressure indicator.

The virtual pressure sensing device may then comprise a conversion law providing a pressure as a function of the electrical characteristic, or indeed in addition to said speed of rotation.

Alternatively, the virtual pressure sensing device may comprise a conversion law providing a pressure as a function of the movement of said pumping member, or the temperature, and the electrical characteristic, or the speed of rotation described above, in order to have optimal precision. This final variant may, to a certain extent, help to protect against wear to the device controlled by the actuator and/or internal friction in the pump, for example.

According to one possibility compatible with the preceding possibilities, the monitoring controller may be configured to determine whether the second supply pressure is identical, within a predetermined margin, to a target pressure, the monitoring controller and the command controller being configured to apply a degraded operating mode when the second supply pressure is not identical, within a predetermined margin, to the target pressure, or to apply the nominal operating mode when the second supply pressure is identical, within a predetermined margin, to the target pressure.

If the target pressure is substantially equal to the second supply pressure, the monitoring controller deduces that the actuator is operating normally. Indeed, this means that the command controller is controlling the pump normally and therefore that the first pressure sensor is functioning correctly, and also that the second pressure sensor is functioning correctly. The actuator continues to apply the nominal operating mode.

If this is not the case, an element of the actuator is malfunctioning, and a degraded operating mode needs to be applied.

According to another example, the monitoring controller may be configured to determine the target pressure based on said pressure setpoint.

The monitoring controller can apply an adjustment law to determine the target pressure. For example, the target pressure is equal to zero when no pressure setpoint is given.

However, when a pressure setpoint is given, the target pressure may be equal to the pressure setpoint plus or minus a margin. Therefore, the current operating mode is, by default, the nominal operating mode, and the test may then be carried out regularly starting from a predetermined time after the pressure setpoint has been received.

According to another possibility, the target pressure may be calculated by a mathematical equation as a function of time and the pressure setpoint.

According to one possibility compatible with the preceding possibilities, the command controller may be configured to determine a first verification pressure based on said at least one verification signal and a conversion law, the monitoring controller being configured to determine a second verification pressure based on said at least one verification signal and the conversion law.

The monitoring controller and the command controller then use these monitoring pressures to evaluate the existence of a failure, and deduce therefrom the actions to be taken as a consequence.

The actuator may possibly comprise a permanent memory storing update data comprising the change, over time, of said value of said at least one operating parameter and at least one of the first and second verification pressures during a current operating cycle of the pump during application of the nominal operating mode, at least said monitoring controller or said command controller being configured to update said conversion law as a function of the stored update data.

The relationship between the value of the operating parameter or parameters and the pressure inside the second hydraulic connection may change over time, for example as a function of the wear to the controlled brake, if applicable. This feature therefore makes it possible to have one and/or the other of the controllers update the conversion law in order to correct the dispersion of the change over time of the pressure as a function of the operating parameter or parameters. For example, the update data is fed into a mathematical model, such as a neural network or a mathematical formula, for example, in order to adjust variable coefficients of the conversion law.

The monitoring controller and the command controller may be configured to apply, when the actuator is not operating in the nominal operating mode, a degraded operating mode chosen from several degraded operating modes as a function of:

a comparison by the monitoring controller of the second verification pressure and the second supply pressure; and a comparison by the command controller of the first verification pressure and the first supply pressure.

If the second verification pressure and the second supply pressure are identical, within a margin, and, at the same time, the first verification pressure and the first supply pressure are different, within a margin, the first supply pressure sensor is defective.

Conversely, if the second verification pressure and the second supply pressure are different, within a margin, and, at the same time, the first verification pressure and the first supply pressure are identical, within a margin, the second supply pressure sensor is defective.

Finally, if the second verification pressure and the second supply pressure are different, within a margin, and, at the same time, the first verification pressure and the first supply pressure are not identical, within a margin, the pump is malfunctioning.

According to one possibility compatible with the preceding possibilities, the command controller can transmit a similarity signal to the monitoring controller indicating whether the first verification pressure and the first supply pressure are identical, within a predetermined margin.

The monitoring controller can then make the aforementioned comparisons in order to evaluate the corrective actions to be taken.

According to one possibility compatible with the preceding possibilities, as long as the second verification pressure and the second supply pressure are identical, within a predetermined margin, and, at the same time, the first verification pressure and the first supply pressure are not identical, within a predetermined margin, said degraded operating mode may be a slave degraded operating mode with the virtual sensor wherein the command controller is configured to transmit a control signal to the pump as a function of the first verification pressure and said pressure setpoint, and the monitoring controller is configured to monitor the actuator by using the second supply pressure.

In this case, the first supply pressure sensor is defective. The monitoring controller transmits a signal to the command controller to command it to apply the slave degraded operating mode with the virtual sensor. The command controller uses the first verification pressure instead of the first supply pressure to control the pump, even a new slave law.

According to one possibility compatible with the preceding possibilities, as long as the second verification pressure and the second supply pressure are not identical, within a predetermined margin, and, at the same time, the first verification pressure and the first supply pressure are not identical, within a predetermined margin, said degraded operating mode may be an inactive mode wherein the command controller is inactive and the monitoring controller is configured to generate an alert.

In this case, the pump is malfunctioning. The monitoring controller can transmit a signal to an alerter, for example to an avionics system in an aircraft. If another actuator is present in the aircraft, the pressure setpoint sent to this other actuator can possibly be increased by the avionics system in the presence of said alert, as described below.

According to one possibility compatible with the preceding possibilities, as long as the second verification pressure and the second supply pressure are not identical, within a predetermined margin, and, at the same time, the first verification pressure and the first measured supply pressure are identical, within a predetermined margin, said degraded operating mode may be a monitoring degraded operating mode, the command controller being configured to transmit a control signal to the pump as a function of the first supply pressure and the monitoring controller is configured to monitor the actuator by using the second verification pressure.

In this case, the second supply pressure sensor is defective. The monitoring controller monitors the operation of the actuator by means of the virtual pressure sensing device, the command controller operating normally. The monitoring controller uses the second verification pressure instead of the second supply pressure, even a new monitoring law.

According to one possibility compatible with the preceding possibilities, the second hydraulic connection may comprise a valve controlled by the command controller.

For example, when a pressure setpoint is reached, the valve is closed in order to keep the pressure downstream of the valve equal to the pressure setpoint.

The disclosure also relates to a method for controlling a first actuator provided with a pump connected to a first hydraulic connection and to a second hydraulic connection, the first hydraulic connection being connected to a reservoir containing a fluid, wherein the method comprises the following steps:
- measuring a first supply pressure in said second hydraulic connection with a first pressure sensor;
- measuring a second supply pressure in said second hydraulic connection with a second pressure sensor;
- in a nominal operating mode, slaving the pressure of the fluid delivered by the pump in the second hydraulic connection, for example with the command controller, as a function of a pressure setpoint and the first supply pressure, and monitoring the actuator, for example with the monitoring controller, as a function of the second supply pressure;
- determining at least one operating parameter of the pump; and
- detecting a failure in the actuator and consequently applying a degraded operating mode as a function of said at least one operating parameter.

This method may also comprise one or more of the following steps:
- determining a first verification pressure, with the command controller, based on a value of said at least one operating parameter and a conversion law;
- determining a second verification pressure, with the monitoring controller, based on a value of said at least one operating parameter and the conversion law;
- comparing the second supply pressure to a target pressure, with the monitoring controller, and applying the nominal operating mode in the affirmative and a degraded operating mode in the negative;
- as long as the second verification pressure and the second supply pressure are identical, within a predetermined margin, and, at the same time, the first verification pressure and the first supply pressure are not identical, within a predetermined margin, said degraded operating mode is a slave degraded operating mode with the virtual sensor;
- as long as the second verification pressure and the second supply pressure are not identical, within a predetermined margin, and, at the same time, the first verification pressure and the first supply pressure are not identical, within a predetermined margin, said degraded operating mode is a slave degraded operating mode without the virtual sensor; and
- as long as the second verification pressure and the second supply pressure are not identical, within a predetermined margin, and, at the same time, the first verification pressure and the first measured supply are pressure identical, within a predetermined margin, said degraded operating mode is a monitoring degraded operating mode.

The first actuator possibly supplies hydraulic fluid to at least one brake of a first main landing gear of an aircraft, said aircraft comprising a second actuator supplying hydraulic fluid to a brake of a second main landing gear, and said pressure setpoint is equal to a first braking pressure during nominal operation and to a second braking pressure greater than the first braking pressure when there is an alert generated by the second actuator.

Moreover, the disclosure is applicable to a braking system. Therefore, a braking system may be provided with a hydraulic brake and a brake control, the braking system comprising an actuator according to the disclosure, said brake control transmitting a pressure setpoint to control the actuator, said second hydraulic connection being hydraulically connected to the hydraulic brake.

Moreover, an aircraft may be provided with two main wheeled landing gears and an auxiliary wheeled landing gear, the two main wheeled landing gears each comprising such a braking system.

The aircraft possibly comprises an immobilization system for immobilizing the auxiliary wheeled landing gear on the ground in a predetermined position, and, for example, for positioning the wheel or wheels of this landing gear substantially parallel to the direction of forward travel of the aircraft and/or to the roll axis of the aircraft.

The aircraft can thus be immobilized on a slope, even if one of the two braking systems malfunctions. By braking the wheel or wheels of a single main landing gear and by locking the auxiliary landing gear relative to the airframe of this aircraft in order to keep its wheel or wheels substantially parallel to the roll axis of the aircraft, the system allows the aircraft to be immobilized in the event of a failure of the braking system of the other main landing gear. The pressure of the hydraulic fluid supplying the braking system during operation may possibly be increased in this configuration.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

Figure 1:
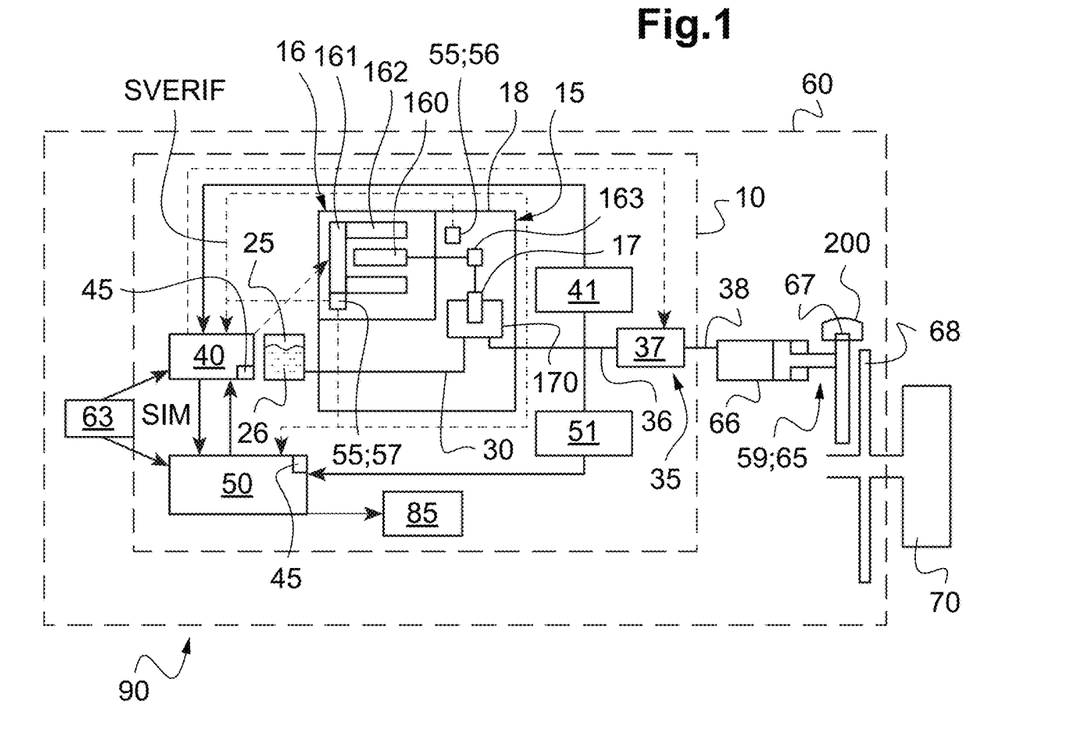
FIG. 1 is a diagram of an actuator according to the disclosure, for example in a braking system.

FIG. 1 shows an electrohydraulic actuator 10. The purpose of this actuator 10 is to inject a fluid 26 into a controlled device 59, if required. According to the example given, this controlled device 59 may be a hydraulic brake 65, the fluid 26 being a conventional brake fluid.

This actuator 10 comprises a pump 15 connected to a first hydraulic connection 30 and to a second hydraulic connection 35 in order to make the fluid flow from the first hydraulic connection 30 to the second hydraulic connection 35, and vice versa. Each hydraulic connection 30, 35 may comprise at least one pipe. The first hydraulic connection 30 is hydraulically connected to a reservoir 25 containing the fluid 26. The second hydraulic connection 35 is hydraulically connected to the controlled device 59. The second hydraulic connection 35 may comprise a valve 37 hydraulically connected to the pump 15 by a first hydraulic connection 36 and to the controlled device 59 by a second hydraulic connection 38.

The pump 15 may comprise an electric motor 16 mechanically linked to at least one pumping member 17, such as a piston, for example. For example, the electric motor 16 may be a brush or brushless motor. The electric motor 16 is supplied with power by a conventional electrical connection that is not shown here, directly or by a command controller 40. The purpose of the electric motor 16 is to set this pumping member 17 in motion in relation to a housing 18 of the pump 15, in order to cause the fluid 26 to flow.

FIG. 1 schematically shows an example of a pump 15. For example, the electric motor 16 comprises a control module 161 controlling a motor module comprising a movable component 160, such as a rotor. Therefore, the control module 161 can deliver an electric current to coils 162 in order to cause the component 160 to rotate, this component 160 comprising permanent magnets. The rotation of the component 160 causes the pumping member 17 to move in translation in relation to a cylinder 170 of the pump 15, via a cam 163. The translational movement of the pumping member 17 of the pump 15 moves fluid 26 through the pump 15.

The pump 15 may be reversible in order to make the fluid 26 flow from the reservoir 25 to the controlled device 59 and from the controlled device 59 to the reservoir 25, as required. Conventional check valves, that are not shown here, may be provided.

The pump 15, and, if applicable, the valve 37, are controlled by a command controller 40.

The term "controller" denotes a processing unit that can apply instructions to implement the steps of the method described below, these instructions being able to be in the form of a code segment, for example. A processing unit may, for example, comprise at least one processor and at least one memory, at least one integrated circuit, at least one programmable system, at least one logic circuit, these examples not limiting the scope given to the expression "processing unit". The term "processor" may refer equally to a central processing unit or CPU, a graphics processing unit or GPU, a digital signal processor or DSP, a microcontroller, etc.

The command controller 40 is thus connected to the pump 15 and, in particular, to the electric motor 16, via a wired or wireless link in order to transmit a control signal to it requesting the operation or stopping of the electric motor 16. The term "signal" refers hereinafter to an analog, digital, optical, electrical or radio signal. For example, the command controller 40 can transmit a power signal that actuates the pump.

Similarly, the command controller 40 is connected, if applicable, to the valve 37, via a wired or wireless link, in order to transmit an open/close signal to it to request the opening or the closing of this valve 37.

Moreover, the command controller 40 is connected, via a wired or wireless link, to a first pressure sensor 41. The first pressure sensor 41 is arranged on the second hydraulic connection 35. The first pressure sensor 41 transmits a signal to the command controller 40 carrying a first supply pressure PCOM in the second hydraulic connection 35.

Moreover, the actuator 10 comprises a monitoring controller 50. The monitoring controller 50 is connected by a wired or wireless link to the command controller 40 and has the function of monitoring the operation of the actuator 10.

To this end, the monitoring controller 50 is connected by a wired or wireless link to a second pressure sensor 51, the second pressure sensor 51 being arranged on the second hydraulic connection 35. The second pressure sensor 51 transmits a signal to the monitoring controller 50 carrying a second supply pressure PMON in the second hydraulic connection 35.

In these conditions, during a nominal operating mode MODNOM, the command controller 40 controls the pump 15 as a function of a pressure setpoint PCONS and the first supply pressure PCOM. The command controller 40 determines whether the fluid 26 needs to flow between the reservoir 25 and the controlled device 59. If this is the case, the command controller 40 transmits a signal to open the valve 37. Moreover, the command controller 40 determines the control signal to send to the pump 15 as a function of a slave law designed to bring the first supply pressure PCOM towards the pressure setpoint PCONS. The pressure setpoint PCONS may be stored, calculated or transmitted by a control operated by an operator.

The monitoring controller 50 monitors the actuator 10 as a function of the second supply pressure PMON, for example by comparing the second supply pressure PMON to a target pressure that depends on the pressure setpoint PCONS, as described below. The monitoring controller 50 can also transmit an alert signal, in particular to an alerter 85, for example of an avionics system in an aircraft. Such an alerter 85 can generate a visual alert, for example emitting a light with a light-emitting diode or an equivalent or one or more characters being displayed on a screen, an audible alarm, via a loudspeaker, and/or a haptic alarm, for example by means of a vibrating unit causing a member held or worn by an individual to vibrate.

In order to detect a possible failure, the actuator 10 also comprises a virtual pressure sensing device. This sensing device is described as virtual insofar as it does not directly measure a pressure, but at least one other parameter that varies together with this pressure.

The virtual pressure sensing device is therefore provided with a pressure model that is, for example, stored in the command controller 40 and the monitoring controller 50. The operating model comprises a conversion law that gives a pressure as a function of the value of one or more operating parameters of the pump 15. Therefore, the virtual pressure sensing device comprises a verification instrument 55 that comprises at least one member that transmits a verification signal SVERIF to the command controller 40 and to the monitoring controller 50 in order to enable them to detect a possible failure of the actuator 10 and in this case apply the required degraded operating mode MODDEG.

The verification signals or signals SVERIF carry the value of an operating parameter of the pump 15.

For example, the verification instrument 55 comprises a movement sensor 56 measuring the movement of the pumping member 17 or of a component 160 of the pump 15, even a temperature sensor measuring a temperature inside or outside the pump 15. For example, the verification signal transmitted by the movement sensor indicates the number of rotations the rotor has made since the activation of the pump 15. This information is a reflection of the volume of fluid 26 passing through the pump 15 and, therefore, the pressure inside the second hydraulic connection 35. Furthermore, the efficiency of the pump 15 may vary as a function of the temperature, that can be evaluated by means of the temperature sensor.

Alternatively, or additionally, the verification instrument 55 comprises a conventional electrical sensing device 57 measuring an electrical characteristic of the electric current consumed by the electric motor 16 of the pump 15, such as an electrical power, for example, and indeed a speed sensor measuring a speed of rotation of the rotor.

The command controller 40 is therefore configured to determine a first verification pressure PV1 based on the verification signal or signals SVERIF and a conversion law of the pressure model. Similarly, the monitoring controller 50 is configured to determine a second verification pressure PV2 based on the verification signal or signals SVERIF and the conversion law. For example, the conversion law comprises either a mathematical equation that gives a pressure as a function of the operating parameter or parameters, or a first mathematical equation that gives a volume as a function of the operating parameter or parameters and a second mathematical equation that gives a pressure as a function of this volume.

Possibly, during an operating cycle of the pump 15 in a nominal operating mode, the value of the operating parameter or parameters and the pressure measured by one of the pressure sensors form update data stored in a permanent memory 45 of the command controller 40 and/or the monitoring controller 50 for updating the conversion law. The controller in question automatically updates the conversion law based on the update data and an update model, for example at the end of an operating cycle, and can transmit the new conversion law to the other controller.

Based on the verification pressures PV1, PV2 and the supply pressures PCOM, PMON, the monitoring controller 50 can evaluate the existence of a failure and the corrective actions to be taken.

Such an actuator 10 may be part of a braking system 60. This braking system 60 may comprise a brake control 63, for example for requesting the application of the parking brake. This brake control 63 can be operated by an operator and may comprise a knob or a lever, for example. This brake control 63 can transmit a setpoint signal to the command controller 40 and to the monitoring controller 50 via a wired or wireless link. The setpoint signal may comprise a pressure setpoint, for example of 0 bar when braking is not requested and 70 bar when the application of the parking brake is requested.

Furthermore, the braking system 60 comprises a conventional hydraulic brake 65 hydraulically connected to the second hydraulic connection 35. For example, such a hydraulic brake 65 comprises one or more hydraulic jacks 66 hydraulically connected to the second hydraulic connection 35 and at least one stator 67 that is able to move in translation in relation to a support 200. The hydraulic jack or jacks 66 are configured to be able to push the stator or stators 67 against one or more rotors 68 secured to a system to be braked.

In particular, the braking system 60 may be arranged on any type of mechanical system wherein a member needs to be braked. For example, the braking system may be arranged on a vehicle in order to brake a wheel 70.

Figure 2:
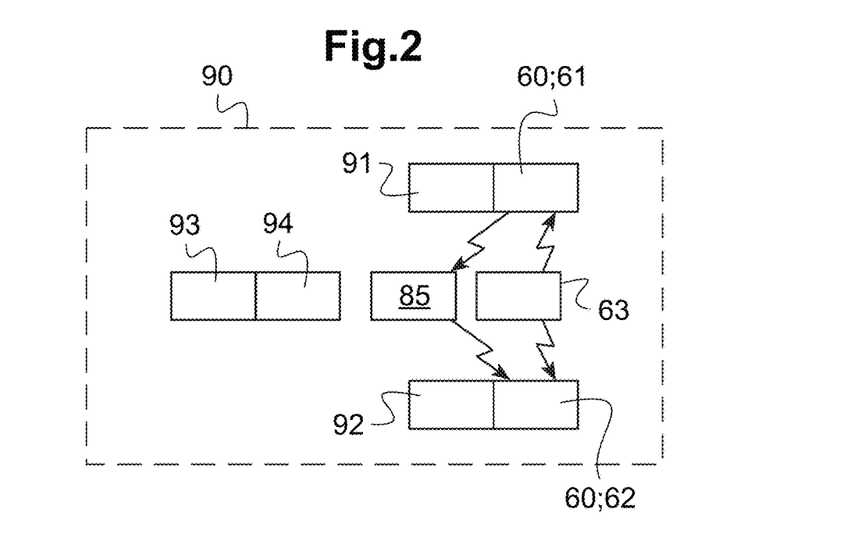
FIG. 2 is a diagram of an aircraft that has braking systems according to the disclosure.

According to FIG. 2, the vehicle may be an aircraft 90. This aircraft 90 may be provided with two main wheeled landing gears 91, 92 and one auxiliary wheeled landing gear 93. Each main wheeled landing gear 91, 92 may then comprise its own braking system 60.

The auxiliary wheeled landing gear 93 may possibly be able to rotate about a control axis to turn the aircraft 90 on the ground. The aircraft 90 may comprise an immobilization system 94 for preventing said rotation and immobilizing the auxiliary wheeled landing gear 93 relative to a fuselage of the aircraft 90 in a predetermined position on the ground. In this predetermined position, the wheel of the auxiliary wheeled landing gear 93 can extend parallel to a direction of forward movement of the aircraft 90. Therefore, even in the event of total failure of a braking system 60, there is no risk of the aircraft 90 turning in an unwanted manner. Such an immobilization system may be of a conventional type, and may, for example, comprise a finger that enters a hole or a notch provided in a plate constrained to rotate with the landing gear.

Figure 3:
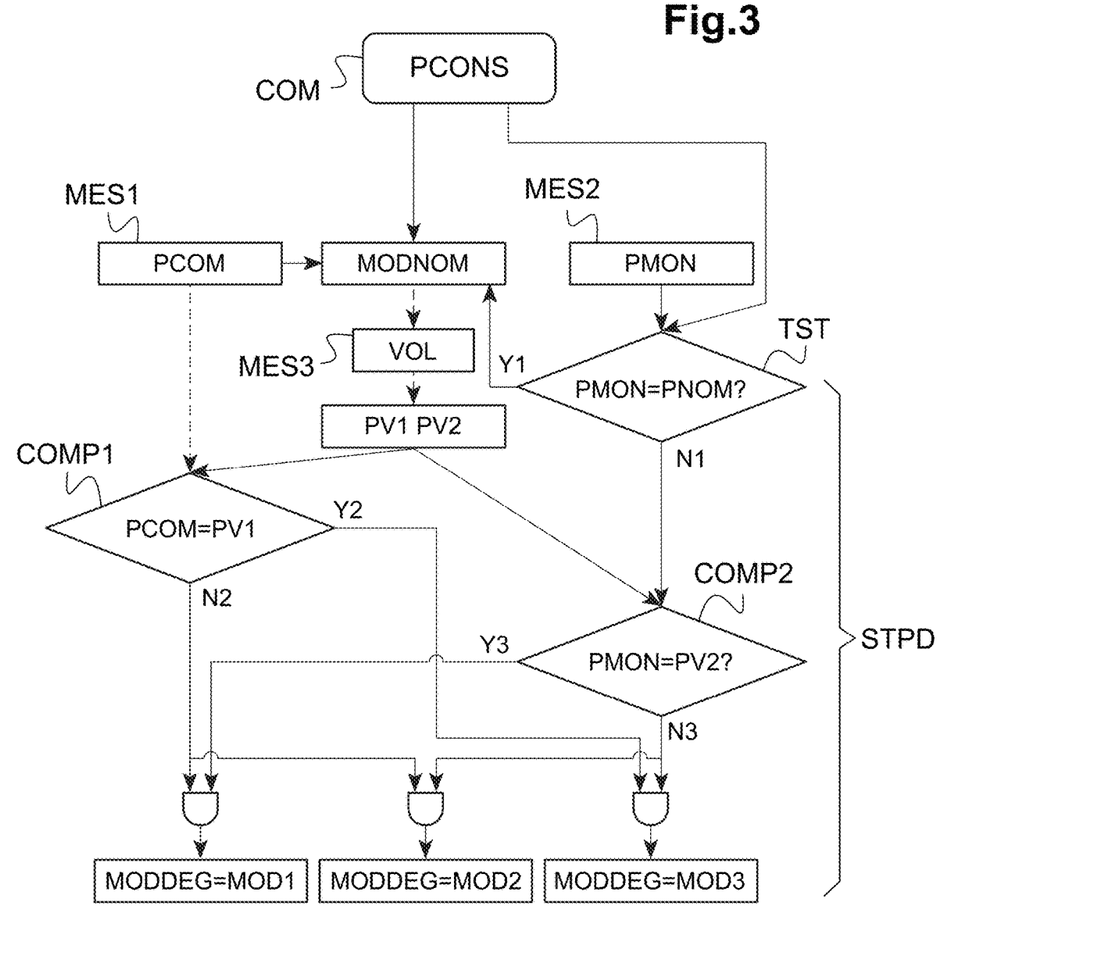
FIG. 3 is a logic diagram depicting the method implemented by the disclosure.

FIG. 3 shows the method implemented by the disclosure.

This method comprises controlling COM the actuator 10 with the brake control 63. The brake control 63 transmits a signal carrying a pressure setpoint PCONS to the command controller 40 and the monitoring controller 50. For example, the braking setpoint PCONS is transmitted to an avionics system, that transmits it to the command controller 40 and the monitoring controller 50 without modification or after modification. For example, if a failure is detected in the first actuator 61 of FIG. 2, the avionics system may comprise an avionics controller configured to increase the pressure setpoint transmitted to the second actuator 62 in order to compensate for the malfunction of the first actuator 61.

Optionally, if there is no action on the brake control 63, the actuator may consider the pressure setpoint to be equal to zero by default.

The method also comprises measuring MES1 a first supply pressure PCOM in the second hydraulic connection 35 with the first pressure sensor 41, and measuring MES2 a second supply pressure PMON in the second hydraulic connection 35 with the second pressure sensor 51.

The monitoring controller 50 then determines the operating state of the actuator as a function of the received pressure setpoint PCONS and the second supply pressure PMON.

As long as no braking is required, the monitoring controller 50 can verify that the second supply pressure PMON is less than a threshold. If this is not the case, an alert may be generated and/or the monitoring controller 50 may electrically disconnect the command controller 40 and/or the pump 15 from a power supply source, for example by transmitting a signal to an electrical relay.

If the braking setpoint is not zero, the operating mode may be the nominal operating mode, by default. Upon receiving the pressure setpoint, the command controller 40 optionally opens the valve 37 and slaves the pump 15 as a function of a difference between the pressure setpoint PCONS and the first supply pressure PCOM.

Then, during a test step TST, the monitoring controller 50 determines a target pressure PNOM, for example based on the pressure setpoint PCONS. The target pressure PNOM may be a pressure range equal to the pressure setpoint, plus or minus a margin, for example.

During this test step TST, the monitoring controller 50 may determine whether the second supply pressure PMON is identical, within a predetermined margin, to the target pressure PNOM, at the end of a predetermined time period. This time period may be established by tests and correspond to the time required in order for the pressure to reach the target pressure in the second hydraulic connection 35.

If this is the case Y1, the monitoring controller 50 applies the nominal operating mode MODNOM, and possibly transmits a signal to the command controller 40 carrying a command to apply the nominal operating mode MODNOM. Moreover, the monitoring controller 50 monitors the operation of the actuator 10 by continuing to monitor the change over time of the second supply pressure PMON in relation to the target pressure PNOM.

If this is not the case N1, the monitoring controller 50 determines the degraded operating mode MODDEG to be applied.

The method then comprises determining MES3 the value of at least one operating parameter VOL of the pump 15 with the verification instrument 55.

The method then comprises detecting STPD a failure of the actuator 10 and consequently applying a degraded operating mode MODDEG as a function of the current value of the operating parameter or parameters.

The command controller 40 thus determines a first verification pressure PV1 as a function of the conversion law in force and the current value of the operating parameter or parameters. Similarly, the monitoring controller 50 thus determines a second verification pressure PV2 as a function of the same conversion law and the current value of the operating parameter or parameters.

During a step COMP1, the monitoring controller 50 compares the second verification pressure PV2 with the second supply pressure PMON.

Similarly, during a step COMP2, the command controller 40 compares the first verification pressure PV1 with the first supply pressure PCOM.

The monitoring controller 50 and the command controller 40 are configured to apply a degraded operating mode MODDEG as a function of these two comparisons.

In order for the monitoring controller 50 to determine the degraded operating mode, the command controller 40 can transmit a similarity signal SIM to the monitoring controller 50 indicating whether the first verification pressure PV1 and the first supply pressure PCOM are identical, within a predetermined margin. The monitoring controller 50 then transmits a signal to the command controller 40 carrying the degraded operating mode to be applied. The reverse is also possible.

As long as the second verification pressure PV2 and the second supply pressure PMON are identical, within a predetermined margin according to the arrow Y3 and, at the same time, the first verification pressure PV1 and the first supply pressure PCOM are not identical, within a predetermined margin according to the arrow N2, the degraded operating mode MODDEG is a slave degraded operating mode with the virtual sensor MOD1.

During this slave degraded operating mode with the virtual sensor MOD1, the command controller 40 transmits a control signal to the pump 15 as a function of the first verification pressure PV1, instead of the first supply pressure PCOM in the nominal operating mode, and the pressure setpoint PCONS. The monitoring controller 50 monitors the actuator 10 in the same way as in the nominal operating mode, by using the second supply pressure PMON.

As long as the second verification pressure PV2 and the second supply pressure PMON are not identical, within a predetermined margin according to the arrow N3 and, at the same time, the first verification pressure PV1 and the first supply pressure PCOM are not identical, within a predetermined margin according to the arrow N2, the degraded operating mode MODDEG is an inactive mode MOD2.

During the inactive mode MOD2, the command controller 40 no longer controls the pump 15, and the monitoring controller 50 transmits a signal to the alerter 85 to signal a malfunction of the pump 15.

As long as the second verification pressure PV2 and the second supply pressure PMON are not identical, within a predetermined margin according to the arrow N3 and, at the same time, the first verification pressure PV1 and the first measured supply pressure PCOM are identical, within a predetermined margin according to the arrow Y2, the degraded operating mode MODDEG is a monitoring degraded operating mode MOD3.

During the monitoring degraded operating mode MOD3, the command controller 40 transmits a control signal to the pump 15 as a function of the first supply pressure PCOM, as in the nominal operating mode. However, the monitoring controller 50 is configured to monitor the actuator 10 by using the second verification pressure PV2 instead of the second supply pressure PMON.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. An actuator for a braking system, the actuator being provided with a pump connected to a first hydraulic connection and to a second hydraulic connection, the first hydraulic connection being connected to a reservoir containing a fluid, the actuator having a command controller communicating with a first pressure sensor, the first pressure sensor being arranged on the second hydraulic connection and measuring a first supply pressure, the actuator comprising a monitoring controller communicating with the command controller and a second pressure sensor, the second pressure sensor being arranged on the second hydraulic connection and measuring a second supply pressure, in a nominal operating mode the monitoring controller being configured to monitor the actuator as a function of the second supply pressure and the command controller being configured to slave a pressure of the fluid delivered by the pump in the second hydraulic connection to a pressure setpoint as a function of the first supply pressure, wherein the actuator comprises a virtual pressure sensing device provided with a pressure model depending on a value of at least one operating parameter of the pump evaluated with a verification instrument that transmits at least one verification signal carrying the value to the command controller and to the monitoring controller in order to identify a failure of the actuator and consequently apply a degraded operating mode, the command controller being configured to determine a first verification pressure based on the at least one verification signal and a conversion law of the pressure model, the monitoring controller being configured to determine a second verification pressure based on the at least one verification signal and the conversion law; the monitoring controller and the command controller being configured to apply, when the actuator is not operating in the nominal operating mode, a degraded operating mode chosen from several degraded operating modes as a function of:
a comparison made by the monitoring controller of the second verification pressure and the second supply pressure; and
a comparison made by the command controller of the first verification pressure and the first supply pressure.

2. The actuator according to claim 1,
wherein the pump comprises an electric motor having a movable component setting a pumping member in motion in relation to a housing, the verification instrument measuring at least one of the following operating parameters: the movement of the pumping member or of the component of the motor, an electrical characteristic of an electric current supplying electrical power to or flowing in the motor.

3. The actuator according to claim 1,
wherein the monitoring controller is configured to determine whether the second supply pressure is identical, within a predetermined margin, to a target pressure, the monitoring controller and the command controller applying a degraded operating mode when the second supply pressure is not identical, within a predetermined margin, to the target pressure.

4. The actuator according to claim 3,
wherein the monitoring controller is configured to determine the target pressure based on the pressure setpoint.

5. The actuator according to claim 1,
wherein the actuator comprises a permanent memory storing update data comprising the change, over time, of the value of the at least one operating parameter and at least one of the first and second verification pressures during a current operating cycle of the pump during application of the nominal operating mode, at least the monitoring controller or the command controller being configured to update the conversion law as a function of the stored update data.

6. The actuator according to claim 1,
wherein, as long as the second verification pressure and the second supply pressure are identical, within a predetermined margin, and, at the same time, the first verification pressure and the first supply pressure are not identical, within a predetermined margin, the degraded operating mode is a slave degraded operating mode with the virtual sensor wherein the command controller is configured to transmit a control signal to the pump as a function of the first verification pressure and the pressure setpoint, and the monitoring controller is configured to monitor the actuator by using the second supply pressure.

7. The actuator according to claim 1, wherein, as long as the second verification pressure and the second supply pressure are not identical, within a predetermined margin, and, at the same time, the first verification pressure and the first supply pressure are not identical, within a predetermined margin, the degraded operating mode is an inactive mode wherein the command controller is inactive and the monitoring controller is configured to generate an alert.

8. The actuator according to claim 1,
wherein, as long as the second verification pressure and the second supply pressure are not identical, within a predetermined margin, and, at the same time, the first verification pressure and the first measured supply pressure are identical, within a predetermined margin, the degraded operating mode is a monitoring degraded operating mode, the command controller being configured to transmit a control signal to the pump as a function of the first supply pressure and the monitoring controller is configured to monitor the actuator by using the second verification pressure.

9. The actuator according to claim 1,
wherein the second hydraulic connection comprises a valve controlled by the command controller.

10. A method for controlling a first actuator provided with a pump connected to a first hydraulic connection and to a second hydraulic connection, the first hydraulic connection being connected to a reservoir containing a fluid, wherein the method comprises the following steps:
measuring a first supply pressure in the second hydraulic connection with a first pressure sensor;
measuring a second supply pressure in the second hydraulic connection with a second pressure sensor;
in a nominal operating mode, slaving the pressure of the fluid delivered by the pump in the second hydraulic connection as a function of a pressure setpoint and the first supply pressure, and monitoring the actuator as a function of the second supply pressure;
determining at least one operating parameter of the pump;
determining a first verification pressure, with the command controller, based on a value of the at least one operating parameter and a conversion law;
determining a second verification pressure, with the monitoring controller, based on a value of the at least one operating parameter and the conversion law; and
detecting a failure of the actuator and consequently applying a degraded operating mode as a function of the at least one operating parameter, the degraded operating mode being chosen from several degraded operating modes as a function of:
a comparison made by the monitoring controller of the second verification pressure and the second supply pressure; and
a comparison made by the command controller of the first verification pressure and the first supply pressure.

11. The method according to claim 10,
wherein, the first actuator supplying hydraulic fluid to a brake of a first main landing gear of an aircraft, the aircraft comprising a second actuator supplying hydraulic fluid to a brake of a second main landing gear, the pressure setpoint being equal to a first braking pressure during normal operation and to a second braking pressure greater than the first braking pressure when there is an alert generated by the second actuator.

12. A braking system provided with a hydraulic brake and a brake control,
wherein the braking system comprises the actuator according to claim 1, the brake control transmitting a pressure setpoint to control the actuator, the second hydraulic connection being hydraulically connected to the hydraulic brake.

13. An aircraft provided with two main wheeled landing gears and an auxiliary wheeled landing gear,
wherein the two main wheeled landing gears each comprise the braking system according to claim 12.

14. The aircraft according to claim 13,
wherein the aircraft comprises an immobilization system for immobilizing the auxiliary wheeled landing gear on the ground in a predetermined position.

* * * * *